United States Patent [19]

Hashimoto et al.

[11] Patent Number: 5,302,316

[45] Date of Patent: Apr. 12, 1994

[54] OPTICAL FIBER COATING COMPOSITION

[75] Inventors: Yutaka Hashimoto; Jun Shirakami; Masayuki Kamei, all of Osaka, Japan

[73] Assignee: Dainippon Ink and Chemicals, Inc., Tokyo, Japan

[21] Appl. No.: 827,212

[22] Filed: Jan. 30, 1992

[30] Foreign Application Priority Data

Jan. 31, 1991 [JP] Japan ................. 3-10609
Mar. 12, 1991 [JP] Japan ................. 3-46698

[51] Int. Cl.$^5$ .................................................. C09K 3/00
[52] U.S. Cl. ............................................. 252/183.11
[58] Field of Search ................................. 252/183.11

[56] References Cited

U.S. PATENT DOCUMENTS

| | | | |
|---|---|---|---|
| 4,511,209 | 4/1985 | Skutnik | 385/145 |
| 4,884,866 | 12/1989 | Hashimoto et al. | 385/145 |
| 4,914,171 | 4/1990 | Zweig | 526/246 |
| 4,971,424 | 11/1990 | Babirad et al. | 385/145 |
| 5,022,737 | 6/1991 | Yamamoto et al. | 385/145 |
| 5,024,507 | 6/1991 | Minns et al. | 385/145 |
| 5,152,287 | 10/1992 | Kane | 128/634 |
| 5,157,148 | 10/1992 | Ohmori et al. | 560/219 |

FOREIGN PATENT DOCUMENTS 257863  9/1988  European Pat. Off. .

Primary Examiner—Edward A. Miller
Attorney, Agent, or Firm—Armstrong, Westerman, Hattori, McLeland & Naughton

[57] ABSTRACT

A curing composition comprising (1) a fluorine-containing curing monomer containing a fluorinated alkyl group having not less than 6 carbon atoms, (2) a fluorine-containing curing monomer containing a fluorinated alkyl group having not more than 5 carbon atoms, and (3) a polyfunctional curing monomer, the weight ratio of said fluorine-containing curing monomer (1) to said fluorine-containing curing monomer (2) ranging from 75/25 to 99/1. The composition is coated on an optical fiber base and cured by active energy rays to provide a core/clad optical fiber excellent in transparency, mechanical strength, environmental resistance, and optical characteristics.

9 Claims, No Drawings

OPTICAL FIBER COATING COMPOSITION

FIELD OF THE INVENTION

This invention relates to an optical fiber and a curing composition for optical fiber cladding. More particularly, it relates to an optical fiber excellent in mechanical strength, environmental resistance, and optical characteristics and to a curing composition for producing the same.

BACKGROUND OF THE INVENTION

Plastic-clad optical fibers comprising quartz, silica, glass, etc. as a core and plastics as a cladding (hereinafter abbreviated as PCF) are relatively cheap, excellent in light transmission, and easy to have an increased numerical aperture and are therefore used as optical fibers for short-to-medium distance communication or light guides.

While silicone resins have conventionally been used as cladding materials, fluorine-containing resins having high hardness have recently been proposed and practically used as cladding materials from the standpoint of easy handling and environmental resistance as disclosed in U.S. Pat. Nos. 4,511,209 and 4,707,076, JP-A-63-40104, JP-A-63-43104, JP-A-63-208805, JP-A-63-208806, JP-A-63-208807, JP-A-63-249112, EP 257863, and EP 333464 (the term "JP-A" as used herein means an "unexamined published Japanese patent application") In particular, EP 257863 discloses an active energy ray-curing cladding material mainly comprising fluorinated acrylates and an optical fiber using the composition as a cladding material, in which the curable cladding material comprises a fluorine-containing curing monomer containing a fluorinated alkyl group having not less than 6 carbon atoms, a fluorine-containing curing monomer containing a fluorinated alkyl group having not more than 5 carbon atoms, and a polyfunctional curing monomer with a weight ratio of the former fluorine-containing curing monomer to the latter fluorine-containing curing monomer being 68/32.

However, having poor compatibility or homogeneity at room temperature, the above-described curable cladding material, when coated as such at room temperature, provides optical fibers having seriously deteriorated optical characteristics such as light transmission properties. Besides, the formed cladding has poor adhesion to the core and easily peels off, causing reduction of environmental resistance or tensile strength of the optical fiber, eventually making the optical fiber useless. Where the cladding material is heated for coating so as to have improved compatibility or homogeneity, the heating temperature must be strictly controlled to prevent eccentricity, etc., which accordingly requires a complicated drawing apparatus and deteriorates workability. Further, where the cladding resin is rendered transparent at room temperature, the resulting cladding layer would have reduced mechanical strength and an increased refractive index and fail to maintain a desired numerical aperture.

Therefore, under the present situation, there is no cladding material which exhibits satisfactory transparency at room temperature, has a low refractive index and excellent workability, and exhibits excellent transparency and dynamic strength after curing to thereby provide an optical fiber having sufficient dynamic strength, optical characteristics, and environmental resistance, e.g., heat- and humidity-resistance.

SUMMARY OF THE INVENTION

Accordingly, an object of the present invention is to provide a curing composition which provides a cured resin simultaneously satisfying the requirements of transparency, mechanical strength, environmental resistance, and optical characteristics.

Another object of the present invention is to provide an optical fiber simultaneously satisfying the requirements of transparency, mechanical strength, environmental resistance, and optical characteristics.

As a result of extensive investigations, the inventors have now found that the above objects of the present invention are accomplished by a curing composition comprising at least two fluorine-containing curing monomers different in carbon atom number of the fluorinated alkyl group thereof at a specific mixing ratio, thus having reached the present invention.

The present invention provides a curing composition including (1) a fluorine-containing curing monomer containing a fluorinated alkyl group having not less than 6 carbon atoms (hereinafter simply referred to as monomer (1)), (2) a fluorine-containing curing monomer containing a fluorinated alkyl group having not more than 5 carbon atoms (hereinafter simply referred to as monomer (2)), and (3) a polyfunctional curing monomer (hereinafter simply referred to as monomer (3)), the weight ratio of monomer (1) to monomer (2) ranging from 75/25 to 99/1.

The present invention also provides an optical fiber comprising an optical fiber base and a coated and cured layer comprising the above-described curing composition.

DETAILED DESCRIPTION OF THE INVENTION

The optical fiber base which can be used in the present invention may be any of commonly employed bases and includes, for example, optical fiber cores made of quartz, silica, glass, or plastics and optical fibers having a core/cladding structure.

Monomers (1) and (2) which can be used in the present invention can be selected from any known compounds having a polymerizable ethylenically unsaturated group. Monomers having the following acrylic ester groups or analogous groups thereof are suitable from the viewpoint of availability and requirements for the particular use as a cladding material, that is, dynamic strength and optical characteristics.

Monomer (1) preferably includes fluorinated (meth)acrylates represented by formula (A):

wherein Rf represents a fluorinated alkyl group having not less than 6 carbon atoms, which may be either straight or branched or which may contain in the main chain thereof an oxygen atom, e.g., $(CF_3)_2CFOC(CF_3)FCF_2-$; and R represents a hydrogen atom, a methyl group, or a fluorine atom.

The terminology "(meth)acrylate" as used herein inclusively means compounds containing an acryloyl group, a methacryloyl group, or an α-fluorinated acryloyl group.

Specific examples of the fluorinated (meth)acrylate represented by formula (A) are shown below for illustrative purposes only but not for limitation:

| | |
|---|---|
| a-1: | $CH_2=CHCOOCH_2CH_2C_8F_{17}$ |
| a-2: | $CH_2=C(CH_3)COOCH_2CH_2C_8F_{17}$ |
| a-3: | $CH_2=CHCOOCH_2CH_2C_{12}F_{25}$ |
| a-4: | $CH_2=C(CH_3)COOCH_2CH_2C_{12}F_{25}$ |
| a-5: | $CH_2=CHCOOCH_2CH_2C_{10}F_{21}$ |
| a-6: | $CH_2=C(CH_3)COOCH_2CH_2C_{10}F_{21}$ |
| a-7: | $CH_2=CHCOOCH_2CH_2C_6F_{13}$ |
| a-8: | $CH_2=C(CH_3)COOCH_2CH_2C_6F_{13}$ |
| a-9: | $CH_2=CHCOOCH_2CH_2C_4F_9$ |
| a-10: | $CH_2=C(F)COOCH_2CH_2C_6F_{13}$ |
| a-11: | $CH_2=CHCOOCH_2(CH_2)_6CF(CF_3)_2$ |
| a-12: | $CH_2=CHCOOCH_2(CF_2)_6H$ |
| a-13: | $CH_2=CHCOOCH_2(CF_2)_8H$ |
| a-14: | $CH_2=C(CH_3)COOCH_2(CF_2)_8H$ |
| a-15: | $CH_2=CHCOOCH_2(CF_2)_{10}H$ |
| a-16: | $CH_2=CHCOOCH_2(CF_2)_{12}H$ |
| a-17: | $CH_2=CHCOOCH_2C(OH)HCH_2C_8F_{17}$ |
| a-18: | $CH_2=CHCOOCH_2CH_2N(C_3H_7)SO_2C_8F_{17}$ |
| a-19: | $CH_2=CHCOOCH_2CH_2N(C_2H_5)COC_7F_{15}$ |
| a-20: | $CH_2=CHCOO(CH_2)_2(CF_2)_8CF(CF_3)_2$ |
| a-21: | $CH_2=C(CH_2CH_2C_8F_{17})COOCH_2CH_2C_8F_{17}$ |

The fluorinated (meth)acrylates (A) may be used either individually or in combinations of two or more thereof.

Preferred fluorinated (meth)acrylates (A) are those represented by formula (A-1) or (A-2):

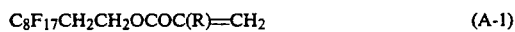

$$C_8F_{17}CH_2CH_2OCOC(R)=CH_2 \quad (A\text{-}1)$$

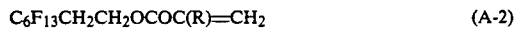

$$C_6F_{13}CH_2CH_2OCOC(R)=CH_2 \quad (A\text{-}2)$$

wherein R is as defined above.

Among the above-mentioned specific examples, preferred fluorinated (meth)acrylates (A) are a-1, a-2, a-7, and a-8, and particularly a-1 and a-7, from the standpoint of transparency, dynamic strength, and solvent resistance of a cured resin and optical characteristics, dynamic strength and solvent resistance of the optical fibers, especially PCF, prepared by using the curing composition.

Monomer (2) preferably includes fluorinated (meth)acrylates represented by formula (B):

$$Rf'OCOC(R)=CH_2 \quad (B)$$

wherein Rf' represents a fluorinated alkyl group containing not more than 5 carbon atoms, which may be either straight or branched; and R is as defined above.

Specific examples of the fluorinated (meth)acrylates represented by formula (B) are shown below for illustrative purposes only but not for limitation:

| | |
|---|---|
| b-1: | $CH_2=CHCOOCH_2CF_3$ |
| b-2: | $CH_2=CHCOOCH_2CF_2CF_3$ |
| b-3: | $CH_2=CHCOOCH_2CFHCF_3$ |
| b-4: | $CH_2=C(CH_3)COOCH_2CFHCF_3$ |
| b-5: | $CH_2=CHCOOCH_2CH_2CF_3$ |
| b-6: | $CH_2=CHCOOCH_2CF_2CFHCF_3$ |
| b-7: | $CH_2=CHCOOCH_2CF(CF_3)CF_3$ |
| b-8: | $CH_2=CHCOOCH(CF_3)_2$ |
| b-9: | $CH_2=C(F)COOCH(CF_3)_2$ |
| b-10: | $CH_2=C(CH_3)COOCH(CF_3)_2$ |
| b-11: | $CH_2=CHCOOCH_2(CF_2CF_2)_2H$ |
| b-12: | $CH_2=C(F)COOCH_2(CF_2CF_2)_2H$ |
| b-13: | $CH_2=C(CH_3)COOCH_2(CF_2CF_2)_2H$ |
| b-14: | $CH_2=CHCOOCH_2CF_2CF_2CFHCF_3$ |

The fluorinated (meth)acrylates (B) may be used either individually or in combinations of two or more thereof.

Preferred fluorinated (meth)acrylates (B) are those represented by formula (B-1) or (B-2):

$$H(CF_2CF_2)_2CH_2OCOC(R)=CH_2 \quad (B\text{-}1)$$

$$(CF_3)_2CHOCOC(R)=CH_2 \quad (B\text{-}2)$$

wherein R is as defined above.

Among the above-mentioned specific examples, preferred fluorinated (meth)acrylates (B) are those in which the terminal fluorine atoms of the fluorinated alkyl group thereof are partly substituted with a hydrogen atom and those in which the fluorinated alkyl group thereof has a branched structure from the standpoint of compatibility or homogeneity of the curing composition at room temperature; stability of these properties; workability and productivity in the production of optical fibers (especially PCF); and optical characteristics and dynamic strength of the optical fibers (especially PCF). Those having a branched fluorinated alkyl group are particularly preferred from the viewpoint of solvent resistance of a cured resin.

To accomplish the objects of the present invention, it is essential to mix monomers (1) and (2). The monomers (1) to (2) mixing ratio ranges from 75/25 to 99/1 by weight, and preferably from 80/20 to 99/1 by weight. If the monomers (1) to (2) mixing ratio is out of the above-mentioned range, compatibility and transparency at room temperature, stability of these properties, dynamic strength, and optical characteristics of the curing composition are deteriorated. Further, such a curing composition has reduced workability or efficiency in the production of optical fibers. Furthermore, the resulting optical fibers undergo reductions in dynamic strength, optical characteristics, and environmental resistance such as solvent resistance.

Monomer (3) may be any of commonly employed polyfunctional curing monomers. Particularly preferred are those generally called polyfunctional (meth)acrylates or special acrylates, and those generally called prepolymers, base resins, oligomers or acrylic oligomers (hereinafter inclusively referred to as (meth)acrylates (C)). Specific examples of (meth)acrylates (C) are shown below.

(i) Polyfunctional (meth)acrylates containing two or more (meth)acrylic ester groups bonded to a polyhydric alcohol.
 (ii) Polyester acrylates containing two or more (meth)acrylic ester groups bonded to a polyester polyol obtained by the reaction between a polyhydric alcohol and a polybasic acid.

Examples of the polyhydric alcohols in (i) and (ii) above are ethylene glycol, 1,4-butanediol, 1,6-hexanediol, diethylene glycol, neopentyl glycol, trimethylolpropane, dipropylene glycol, polyethylene glycol, polypropylene glycol, pentaerythritol, and dipentaerythritol. Examples of the polybasic acids in (ii) are phthalic acid, adipic acid, maleic acid, trimellitic acid, itaconic acid, succinic acid, terephthalic acid, and an alkenylsuccinic acid.

(iii) Epoxy-modified (meth)acrylates comprising an epoxy resin whose epoxy group is esterified with (meth)acrylic acid to a (meth)acryloyl functional group.

Examples of the epoxy resin are bisphenol A-epichlorohydrin epoxy resins, phenol-novolak-epichlorohydrin epoxy resins, and polyhydric alcohol-epichlorohydrin alicyclic resins.

(iv) Polyurethane acrylates obtained by reacting a polyisocyanate compound with a hydroxyl-containing (meth)acrylate.

Examples of the polyisocyanate compound include compounds having a polyester, polyether or polyurethane skeleton having bonded to both terminals of an isocyanate group.

(v) Polyether (meth)acrylates, melamine (meth)acrylates, alkyd (meth)acrylates, isocyanurate (meth)acrylate, and silicone (meth)acrylates.

Specific examples of (meth)acrylates (C) are shown below for illustrative purposes only but not for limitation.

| c-1: | Ethylene glycol di(meth)acrylate |
|---|---|
| c-2: | Diethylene glycol di(meth)acrylate |
| c-3: | Triethylene glycol di(meth)acrylate |
| c-4: | Polyethylene glycol di(meth)acrylate (number average molecular weight: 150–1000) |
| c-5: | Propylene glycol di(meth)acrylate |
| c-6: | Dipropylene glycol di(meth)acrylate |
| c-7: | Tripropylene glycol di(meth)acrylate |
| c-8: | Polypropylene glycol di(meth)acrylate (number average molecular weight: 200–1000) |
| c-9: | Neopentyl glycol di(meth)acrylate |
| c-10: | 1,3-Butanediol glycol di(meth)acrylate |
| c-11: | 1,4-Butanediol glycol di(meth)acrylate |
| c-12: | 1,6-Hexanediol glycol di(meth)acrylate |
| c-13: | Hydroxypivalic ester neopentyl glycol di(meth)acrylate |
| c-14: | Bisphenol A glycol di(meth)acrylate |
| c-15: | Trimethylolpropane tri(meth)acrylate |
| c-16: | Pentaerythritol tri(meth)acrylate |
| c-17: | Dipentaerythritol hexa(meth)acrylate |
| c-18: | Pentaerythritol tetra(meth)acrylate |
| c-19: | Trimethylolpropane di(meth)acrylate |
| c-20: | Dipentaerythritol monohydroxypenta(meth)acrylate |

These (meth)acrylates (C) are commercially available under the following trade names. The parentheses indicate the corresponding compound No. listed above.

Neomer MA-305 (c-21), Neomer BA-60 (c-22), Neomer TA-505 (c-23), Neomer TA-401 (c-24), Neomer PHA 405X (c-25), Neomer TA 705X (c-26), Neomer EA 400X (c-27), Neomer EE 401X (c-28), Neomer EP 405X (c-29), Neomer HB 601X (c-30), and Neomer HB 605X (c-31) - all produced by Sanyo Chemical Industries, Ltd.

KAYARAD HY-220 (c-32), HX-620 (c-33), D-310 (c-34), D-320 (c-35), D-330 (c-36), DPHA (c-37), DPCA-20 (c-38), DPCA-30 (c-39), DPCA-60 (c-40), and DPCA-120 (c-41) - all produced by Nippon Kayaku Co., Ltd.

FA-713A (c-42) - produced by Hitachi Chemical Co., Ltd.

These polyfunctional (meth)acrylates (C) may be used either individually or in combinations of two or more thereof.

According to the inventors' finding, preferred of the above described (meth)acrylates (C) are c-9 and c-15, and particularly c-15, from the standpoint of compatibility with fluorinated (meth)acrylates (A) and (B) and optical characteristics and dynamic strength after curing.

For the purpose of reducing a refractive index of the curing composition, fluorine-containing polyfunctional monomers, such as those represented by formula shown below, may also be used as monomer (3).

wherein R is as defined above; x represents 1 or 2; and y represents an integer of from 4 to 12.

Specific examples of such fluorine-containing polyfunctional monomers are shown below.

| c-43: | $CH_2=CHCOOCH_2(C_2F_4)_2CH_2OCOCH=CH_2$ |
|---|---|
| c-44: | $CH_2=CHCOOC_2H_4(C_2F_4)_3C_2H_4OCOCH=CH_2$ |
| c-45: | $CH_2=C(CH_3)COOC_2H_4(C_2F_4)_3C_2H_4OCOC(CH_3)=CH_2$ |
| c-46: | $CH_2=C(F)COOC_2H_4(C_2F_4)_6C_2H_4OCOC(F)=CH_2$ |
| c-47: | $CH_2=CHCOOC_2H_4(C(CF_3)FCF_2)_4C_2H_4OCOCH=CH_2$ |
| c-48: | $CH_2=CHCOOC_2H_4(C_2H_4)_a(C(CF_3)FCF_2)_b C_2H_4OCOCH=CH_2$ |

The fluorine-containing polyfunctional monomer further includes compounds represented by formula:

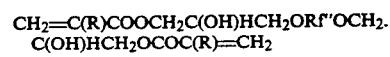

wherein R is as defined above; and Rf" represents $(CH_2)_x(CF_2)_y(CH_2)_x$, wherein x and y are as defined above,

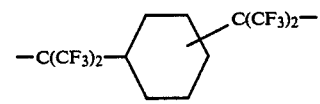

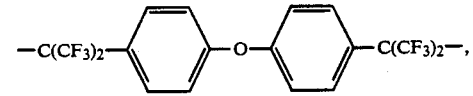

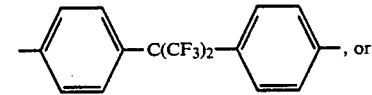

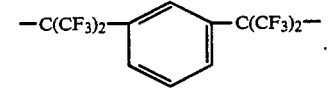

The proportion of monomer (3) in the curing composition is not particularly limited but preferably ranges from 1 to 50%, preferably from 1 to 45%, and more preferably from 1 to 30%, by weight from the viewpoint of optical characteristics and dynamic strength.

As monomer (3), trimethylolpropane triacrylate is preferably used from the standpoint of compatibility with monomer (1) and monomer (2), curing property, and transparency, dynamic strength, and solvent resistance after curing, and further optical characteristics, mechanical strength, and solvent resistance as optical fibers.

In order to improve environmental resistance of the curing composition after curing, such as heat resistance and moisture resistance, and to improve the same properties of the curing composition after molded into a cladding layer, it is very effective to incorporate in the curing composition an antioxidant, such as thiol-containing compounds and hindered phenol compounds. From the standpoint of curing properties and environmental resistance of the composition, thiol-containing compounds are preferred.

Thiol-containing compounds as antioxidant include monofunctional thiol compounds, such as alkylthiol compounds having from 2 to 18 carbon atoms in the alkyl moiety thereof, thioglycolic esters containing an alkyl group having from 2 to 18 carbon atoms, and $C_8F_{17}CH_2CH_2SH$; and polyfunctional thiol compounds having at least two thiol groups per molecule, such as neopentyl thioglycol, trithiomethylolpropane, and thiodicarboxylic acid esters, e.g., dilauryl thiodipropionate. Particularly preferred of these thiol-containing compounds is γ-mercaptopropyltrimethoxysilane which contains a coupling group as well as a thiol group per molecule and contributes to excellent environmental resistance, i.e., heat- and moisture-resistance, of optical fibers, particularly PCF.

Specific examples of hindered phenol compounds useful as antioxidant are 2,6-di-t-butyl-4-methylphenol, 2,2'-methylenebis(4-methyl-6-t-butylphenol), 4,4'-thiobis(6-t-butyl-3-methylphenol), 4,4'-butylidene-bis(3-methyl-6-t-butylphenol), 1,3,5-trimethyl-2,4,6-tris(3,5-di-t-butyl-4-hydroxybenzyl)-benzene,1,3,5-tris(2-methyl-4-hydroxy-5-t-butylphenol)butane, octadecyl-3-(3,5-di-t-butyl-4-hydroxyphenyl)propionate, triethylene glycol bis[3-(3-t-butyl-5-methyl-4-hydroxyphenyl)propionate], 1,6-hexanediol bis[3-(3,5-di-t-butyl-4-hydroxyphenyl)propionate], 2,2-thio-diethylenebis[3-(3,5-di-t-butyl-4-hydroxyphenyl)propionate], and pentaerythrityl-tetrakis[3-(3,5-di-t-butyl-4-hydroxyphenyl)propionate].

These thiol-containing compounds and hindered phenol compounds may be used either individually or in combinations of two or more thereof.

The proportion of the thiol-containing compounds or hindered phenol compounds in the curing composition ranges from 0.01 to 5% by weight and, for better optical characteristics and dynamic strength after curing, from 0.01 to 3% by weight.

If desired, the curing composition of the present invention may further contain other various additives and a photopolymerization initiator in addition to the above-described components.

Additives which can be used in the present invention include polymers and solvents for viscosity adjustment; light stabilizers, coloring agents; coupling agents for improving adhesion between an optical fiber base and a cladding; defoaming agents, leveling agents, and surface active agents for uniform coating; surface modifiers for controlling adhesion between optical fibers and a primary coating; flame retardants; and plasticizers.

Useful coupling agents include silane coupling agents, titanium coupling agents, and zirco-aluminate coupling agents, with silane coupling agents being preferred. Specific examples of the silane coupling agents are dimethyldimethoxysilane, dimethyldiethoxysilane, methyltrimethoxysilane, dimethylvinylmethoxysilane, phenyltrimethoxysilane, γ-chloropropyltrimethoxysilane, γ-chloropropylmethyldimethoxysilane, γ-aminopropyltriethoxysilane, γ-glycidoxypropyltrimethoxysilane, γ-glycidoxypropylmethyldimethoxysilane, γ-methacryloxypropylmethoxysilane, γ-methacryloxypropylmethyldimethoxysilane, γ-acryloxypropylmethyltrimethoxysilane, γ-acryloxypropylmethyldimethoxysilane, and γ-mercaptopropyltrimethoxysilane which also serves as an antioxidant as described above.

Defoaming agents, leveling agents, surface active agents, and surface modifiers to be used are preferably fluorine-containing compounds.

In addition to the above-described thiol-containing compounds and hindered phenol compounds, phosphorus-containing compounds and disulfide-containing compounds are also useful as antioxidants.

Useful flame retardants include bromine-containing flame retardants, zinc compounds, antimony compounds, phosphorus compounds, and combinations thereof. Examples of the bromine-containing flame retardants are decabromodiphenyl oxide, hexabromobenzene, hexabromocyclododecane, dodecachloropentacyclooctadeca-7,15-diene,tetrabromobisphenol A, tribromophenol, tetrabromophthalic anhydride, dibromoneopentyl glycol, and 2-(2,4,6-tribromophenoxy)ethyl (meth)acrylate. Examples of the zinc compounds are zinc borate compounds (e.g., $3ZnO_2 \cdot 2B_2O_3 \cdot 3H_2O$, $2ZnO \cdot 3B_2O_3 \cdot 3.5H_2O$), zinc molybdate compounds (e.g., $ZnO \cdot ZnMoO_4$, $CaO \cdot ZnMoO_4$), $Zn_3(PO_4)_2 \cdot 4H_2O$, ZnO-MgO complex calcined materials, ZnO, and $ZnCO_3$. Examples of the antimony compounds include antimony trioxide.

For the purpose of plasticizing the curing composition or controlling the refractive index of the resulting cladding, non-polymerizable fluorine compounds; fluorinated alcohols, e.g., $HO(CH_2)_rC_sF_{2s+1}$, wherein r is an integer of from 1 to 4, and s is an integer of from 1 to 20; fluorinated carboxylic acids, e.g., $HOOC(CH_2)_t$-$C_uF_{2u+1}$, wherein t is 0 or an integer of from 1 to 4, and u is an integer of from 1 to 20; fluorinated polyethers generally called fluorine oils; and so-called fluorine-containing inert liquids, e.g., $N(C_4F_9)_3$, perfluorodecalin, $C_8F_{17}OC_4F_9$, and $C_9F_{20}$, can also be added to the curing composition.

The curing composition according to the present invention can be applied to an optical fiber base, especially an optical fiber core, by coating or impregnation and then irradiated with an active energy ray, e.g., light, electron beam, or radiation, to undergo polymerization curing to form a desired coating layer or cladding layer. In some cases, heat may be used as a curing energy source either alone or in combination with the above-mentioned active energy ray.

Where light, such as ultraviolet light, is used as an active energy ray, photopolymerization initiators known in the art can be used as a catalyst. Examples of suitable photopolymerization initiators are (d-1) benzophenone; (d-2) acetophenone; (d-3) benzoin; (d-4) benzoin ethyl ether; (d-5) benzoin isobutyl ether; (d-6) benzyl methyl ketal; (d-7) azobisisobutyronitrile; (d-8) hydroxycyclohexyl phenyl ketone; and (d-9) 2-hydroxy-2-methyl-1-phenylpropan-1-one. If desired, polymerization can be accelerated by addition of photosensitizers, such as amine compounds and phosphorus compounds.

The photopolymerization initiator is preferably used in an amount of from 0.01 to 10% by weight, and more preferably from 0.1 to 7% by weight, based on the total weight of the curing composition. Where polymerization curing is effected with electron rays or radiation, any initiator is not particularly needed.

Where heat is utilized as a polymerization initiator, polymerization curing can be carried out in the presence or absence of a polymerization initiator, e.g., azobisisobutyronitrile, benzoyl peroxide, and methyl ethyl ketone peroxide-cobalt naphthenate, at a temperature, e.g., of from 80° to 200° C.

Polymerization curing with any of ultraviolet beam, electron rays, and radiation is preferred as compared with heat curing from the standpoint of workability, productivity and economy in the production of optical fibers and performance characteristics of the resulting optical fibers. In particular, ultraviolet curing is the most convenient and economical.

If desired, a solvent may be added to the curing composition for the purpose of controlling viscosity, coating properties, and coating film thickness. Solvents to be used are not particularly limited as far as they have no adverse influences on the polymerization reaction. Examples of suitable solvents include alcohols, e.g., methanol, ethanol, and isopropyl alcohol; ketones, e.g., acetone, methyl ethyl ketone, and methyl isobutyl ketone; esters, e.g., methyl acetate, ethyl acetate, and butyl acetate; chlorinated hydrocarbons, e.g., chloroform, dichloroethane, and carbon tetrachloride; and low-boiling organic solvents, e.g., benzotrifluoride, chlorobenzotrifluoride, m-xylene hexafluoride, tetrachlorodifluoroethane, 1,1,2-trichloro-1,2,2-trifluoroethane, and trichloromonofluoromethane. The solvent, if used, must be removed from the coated layer before the commencement of polymerization curing at room temperature or, if desired, under heating or under reduced pressure. In cases when the solvent is removed by heating, the heating temperature should be so controlled as not to induce thermal polymerization of the monomers, etc.

The curing composition can be coated on an optical fiber base, i.e., an optical fiber core or a core/cladding optical fiber, by various known techniques, such as coating by means of a brush, an applicator, a bar coater, a roller brush, or a roll coater; spray coating by means of an airless spray coater; flow coating by means of a shower coater or a curtain coater; dip coating; and casting. An appropriate coating technique should be selected according to the material, shape or use of the base.

For the formation of a cladding or a coat on an optical fiber core or a core/cladding optical fiber, known coating and curing techniques as described in West German Patent Publication No. 2,459,320, JP-A-53-139545, and U.S. Pat. No. 4,125,644 can be employed. For example, an optical fiber base is threaded through an extrusion-coating die, and the curing composition is continuously extrusion-coated on the base. After removal of a solvent, if any, an active energy ray is irradiated onto the coating to form a cladding or a coat.

Any conventional active energy ray source for polymerization curing can be used, for example, germicidal lamps, fluorescent sunlamps, carbon arc lamps, xenon lamps, high-pressure mercury lamps for copying, middle- or high-pressure mercury lamps, ultrahigh-pressure mercury lamps, electrodeless discharge tubes, metal halide lamps, and natural sunlight for ultraviolet rays; and scanning type or curtain type electron accelerators for electron rays. Where a coating film having a thickness of 5 $\mu$m or less is cured with ultraviolet rays, ultraviolet irradiation is preferably conducted in an inert gas atmosphere, e.g., nitrogen gas, for ensuring polymerization efficiency.

Optical fiber cores which can be coated with the curing composition of the present invention include those made of inorganic materials such as quartz, silica, and glass; and those made of plastics such as polymethyl methacrylate, deuterated polymethyl methacrylate, polystyrene, and polycarbonate. Taking the characteristics of the curing composition of the present invention into consideration, quarts, silica, and glass are particularly suitable materials.

The curing composition according to the present invention is applicable as not only a cladding of an optical fiber core or a coat of a core/cladding optical fiber as hereinbefore described but also a cladding of light waveguide sheets, adhesives for optics, electrically insulating materials (e.g., potting materials and sealants), and wire coatings. Further, having a low refractive index, the curing composition of the present invention also finds its use as a low reflecting coat on a transparent glass or plastic sheet or plate or as a sealant for optical IC.

In addition, since the curing composition of the present invention forms a cured film excellent in scratch resistance, oil resistance, smoothness, water- and oil-repellency, water resistance, moistureproofness, rustproofness, stainproofness, release properties, and low water absorption properties, it is useful as a protective coat of various materials and substrates.

For example, the curing composition is suitable as a protective coat on non-magnetic metals, e.g., copper, aluminum and zinc; a protective coat on plastics, e.g., polyesters (e.g., polyethylene terephthalate, polyethylene-2,6-naphthalate), polyolefins (e.g., polypropylene), cellulose derivatives (e.g., cellulose acetate), and polycarbonate; and, in some cases, as a protective coat on a magnetic layer of magnetic tapes or discs, including a ferromagnetic alloy film (comprising iron, cobalt and/or nickel as major components and aluminum, silicon, chromium, manganese, molybdenum, titanium, various heavy meals, or rare earth metals as minor components) deposited on glass, paper, wood, fibrous materials or ceramics (porcelain and earthenware) and a magnetic layer comprising iron, cobalt and chromium, deposited on a plastic film (e.g., a polyester film) in the presence of a trace amount of oxygen; and also as a surface or back surface treating agent for magnetic recording media, e.g., magnetic tape and floppy discs, which are particularly required to have lubricity.

On the other hand, since the curing composition of the present invention is capable of forming a transparent, smooth, and thin film on a glass surface, it is also useful in applications requiring oil resistance and wiping resistance as an oil strain inhibitor or an oil penetration inhibitor for various optical instruments.

Further, the curing composition of the present invention is suitable as a protective film of solar cells which particularly require moistureproofness or as a protective coat of optical fibers, optical fiber cables, optical discs, and optomagnetic discs. Furthermore, the excellent scratch resistance, stainproofness and moisture resistance of the composition can be taken advantage of for use in surface protection of medical tools or equipment, surface protection of teeth or artificial teeth, filling of teeth, or molding of artificial teeth.

The curing composition of the present invention is applicable to various molded products or as hard coating agents for films, sheets, etc., since the coated film is excellent in scratch resistance.

The curing composition of the present invention can be compounded with pigments and dispersing agents to provide stainproof and non-tacky coatings or inks applicable to the bottom of ships.

The present invention is now illustrated in greater detail with reference to Examples, but it should be understood that the present invention is not deemed to be limited thereto. All the percents, parts, and ratios are by weight unless otherwise indicated.

EXAMPLES 1 TO 10 AND COMPARATIVE EXAMPLES 1 TO 3

Curing compositions of the present invention and comparative compositions were prepared according to the formulation shown in Table 1.

An optical fiber core having an outer diameter of 200 μm obtained by melt spinning of synthetic quartz at a drawing speed of 60 m/min was threaded through an extrusion-coating die, and each curing composition prepared was continuously coated thereon at the die temperature of 25° C. and cured in a nitrogen atmosphere by means of two high-pressure mercury lamps (output: 120 W/cm) to obtain a PCF having a 15 μm thick cladding.

Physical properties of the curing composition and transmission loss of the resulting PCF were determined according to the following test methods. The results obtained are shown in Table 1.

1) Transparency before Curing

Transparency of a curing composition was evaluated with eyes.

2) Transparency after Curing

A curing composition was cast on a 1 mm deep glass-made tray, and a 1 mm thick quartz plate was put thereon taking care not to incorporate air bubbles. The cast composition was cured by irradiation using a high-pressure mercury lamp of 120 W/cm, and transparency of the resulting cured resin plate was observed with eyes.

3) Refractive Index

A refractive index of the 1 mm thick cured resin plate as prepared in (2) above with an Abbe refractometer.

4) Transmission Loss (Initial)

Transmission loss was measured at a wavelength of 850 nm according to a cut-back method.

5) Transmission Loss after Exposure to Heat

After the PCF was preserved at 130° C. for 1000 hours, the transmission loss was measured in the same manner as described above.

6) Transmission Loss after Exposure to Moisture

After the PCF was preserved at 70° C. and 98% RH for 500 hours, the transmission loss was measured in the same manner as described above.

TABLE 1

| Example No. | Curing Composition (part) | | Transparency Before Curing | Transparency After Curing | Refractive Index After Curing | Shore Hardness | Transmission Loss (dB/km) Initial | After Exposure to Heat | After Exposure to Moisture |
| --- | --- | --- | --- | --- | --- | --- | --- | --- | --- |
| Example 1 | a-1 | 68.0 | trans-parent | trans-parent | 1.403 | D76 | 5.4 | 5.8 | 5.9 |
| | b-11 | 7.5 | | | | | | | |
| | c-15 (A*) | 24.0 | | | | | | | |
| | d-9 | 0.5 | | | | | | | |
| | MPTMS** | 1.4 | | | | | | | |
| Example 2 | a-1 | 56.6 | trans-parent | trans-parent | 1.414 | D75 | 5.5 | 5.9 | 5.9 |
| | b-11 | 18.9 | | | | | | | |
| | c-15 (A) | 24.0 | | | | | | | |
| | d-9 | 0.5 | | | | | | | |
| | MPTMS | 1.4 | | | | | | | |
| Comparative Example 1 | a-1 | 51.3 | trans-parent | slightly turbid | 1.418 | D68 | 9.6 | 36.2 | 49.9 |
| | b-11 | 24.2 | | | | | | | |
| | c-15 (A) | 24.0 | | | | | | | |
| | d-9 | 0.5 | | | | | | | |
| | MPTMS | 1.4 | | | | | | | |
| Comparative Example 2 | a-1 | 68.0 | opaque | whitened | unmeasure-able | D-43 | >100 | >300 | >300 |
| | a-7 | 7.5 | | | | | | | |
| | c-15 (A) | 24.0 | | | | | | | |
| | d-9 | 0.5 | | | | | | | |
| | MPTMS | 1.4 | | | | | | | |
| Comparative Example 3 | a-1 | 75.5 | opaque | whitened | unmeasure- | D45 | >100 | >300 | >300 |
| | c-15 (A) | 24.0 | | | | | | | |
| | d-9 | 0.5 | | | | | | | |
| | MPTMS | 1.3 | | | | | | | |
| Example 3 | a-1 | 66.2 | trans-parent | trans-parent | 1.408 | D74 | 5.6 | 6.5 | 6.4 |
| | b-8 | 9.3 | | | | | | | |
| | c-15 (A) | 24.0 | | | | | | | |
| | d-9 | 0.5 | | | | | | | |
| | MAPTMS*** | 0.5 | | | | | | | |
| | acrylic acid | 0.1 | | | | | | | |
| Example 4 | a-1 | 66.2 | trans-parent | trans-parent | 1.408 | D74 | 5.5 | 5.7 | 5.8 |
| | b-8 | 9.3 | | | | | | | |
| | c-15 (A) | 24.0 | | | | | | | |
| | d-9 | 0.5 | | | | | | | |
| | MPTMS | 1.3 | | | | | | | |
| Example 5 | a-1 | 70.0 | trans-parent | trans-parent | 1.400 | D75 | 5.7 | 6.5 | 6.6 |
| | b-1 | 5.0 | | | | | | | |
| | c-15 (A) | 24.0 | | | | | | | |
| | d-9 | 0.5 | | | | | | | |
| | octyl thio-glycolate | 0.5 | | | | | | | |
| | MPATMS | 0.5 | | | | | | | |
| Example 6 | a-1 | 72.5 | trans- | trans- | 1.401 | D77 | 5.4 | 5.7 | 5.8 |

TABLE 1-continued

| Example No. | Curing Composition (part) | | Transparency Before Curing | Transparency After Curing | Refractive Index After Curing | Shore Hardness | Transmission Loss (dB/km) Initial | Transmission Loss (dB/km) After Exposure to Heat | Transmission Loss (dB/km) After Exposure to Moisture |
|---|---|---|---|---|---|---|---|---|---|
| | b-8 | 3.0 | parent | parent | | | | | |
| | c-15 (A) | 22.0 | | | | | | | |
| | c-9 (A) | 2.0 | | | | | | | |
| | d-9 | 0.5 | | | | | | | |
| | MPTMS | 1.4 | | | | | | | |
| Example 7 | a-1 | 40.9 | trans-parent | trans-parent | 1.437 | D79 | 5.5 | 5.9 | 6.1 |
| | b-3 | 13.6 | | | | | | | |
| | c-15 (A) | 45.0 | | | | | | | |
| | d-9 | 0.5 | | | | | | | |
| | MAPTMS | 0.7 | | | | | | | |
| | TP**** | 0.5 | | | | | | | |
| Example 8 | a-7 | 76.8 | trans-parent | trans-parent | 1.397 | D68 | 5.4 | 5.7 | 5.7 |
| | b-11 | 3.2 | | | | | | | |
| | c-15 (A) | 19.5 | | | | | | | |
| | d-9 | 0.5 | | | | | | | |
| | MPTMS | 1.2 | | | | | | | |
| Example 9 | a-13 | 68.0 | trans-parent | trans-parent | 1.402 | D75 | 5.5 | 6.2 | 6.2 |
| | b-11 | 7.5 | | | | | | | |
| | c-15 (A) | 24.0 | | | | | | | |
| | d-9 | 0.5 | | | | | | | |
| | MPTMS | 1.2 | | | | | | | |
| Example 10 | a-1 | 68.0 | trans-parent | trans-parent | 1.403 | D75 | 5.5 | 6.3 | 6.4 |
| | b-11 | 7.5 | | | | | | | |
| | c-15 (A) | 24.0 | | | | | | | |
| | d-9 | 0.5 | | | | | | | |
| | MAPTMS | 1.4 | | | | | | | |

Note:
*Acrylate compound
**γ-Mercaptopropyltrimethoxysilane
***γ-Methacryloxypropyltrimethoxysilane
****2,2-Thio-diethylenebis[3-(3,5-di-t-butyl-4-hydroxyphenyl)propionate

EXAMPLE 11

Curing compositions having the following formulation were prepared using each of the fluorinated (meth)acrylates (A) and fluorinated (meth)acrylates (B) shown in Table 2. A Shore hardness after curing and transparency before and after curing were examined. The results obtained are shown in Table 2.

| Formulation | |
|---|---|
| Fluorinated (meth)acrylate (A) | 63.6% |
| Fluorinated (meth)acrylate (B) | 15.9% |
| c-15 (A) | 20.0% |
| d-9 | 0.5% |
| γ-Mercaptopropyltrimethoxysilane | 1.2% |

The symbol "G" in Table 2 means satisfactory transparency:- the left one indicates transparency before curing, and the right one after curing.

TABLE 2

| Fluorinated (Meth)-acrylate (B) | Fluorinated (Meth)acrylate (A) | | | | | | | | |
|---|---|---|---|---|---|---|---|---|---|
| | a-1 | a-2 | a-5 | a-6 | a-7 | a-8 | a-9 | a-12 | a-13 |
| b-1 | D75 | D75 | D77 | D70 | D73 | D73 | D66 | D76 | D79 |
| | G/G | G/G | G/G | G/G | G/G | G/G | G/G | G/G | G/G |
| b-2 | D76 | D73 | D76 | D69 | D70 | D70 | D65 | D77 | D79 |
| | G/G | G/G | G/G | G/G | G/G | G/G | G/G | G/G | G/G |
| b-3 | D74 | D72 | D77 | D65 | D72 | D72 | D66 | D78 | D77 |
| | G/G | G/G | G/G | G/G | G/G | G/G | G/G | G/G | G/G |
| b-4 | D70 | D72 | D70 | D68 | D70 | D72 | D67 | D76 | D78 |
| | G/G | G/G | G/G | G/G | G/G | G/G | G/G | G/G | G/G |
| b-5 | D76 | D74 | D76 | D69 | D70 | D73 | D65 | D75 | D79 |
| | G/G | G/G | G/G | G/G | G/G | G/G | G/G | G/G | G/G |
| b-6 | D77 | D73 | D78 | D70 | D71 | D74 | D64 | D77 | D79 |
| | G/G | G/G | G/G | G/G | G/G | G/G | G/G | G/G | G/G |
| b-7 | D77 | D74 | D76 | D65 | D73 | D73 | D64 | D76 | D77 |
| | G/G | G/G | G/G | G/G | G/G | G/G | G/G | G/G | G/G |
| b-8 | D79 | D80 | D79 | D69 | D78 | D76 | D66 | D80 | D77 |
| | G/G | G/G | G/G | G/G | G/G | G/G | G/G | G/G | G/G |
| b-9 | D78 | D80 | D75 | D65 | D76 | D76 | D67 | D78 | D76 |
| | G/G | G/G | G/G | G/G | G/G | G/G | G/G | G/G | G/G |
| b-10 | D77 | D76 | D72 | D66 | D76 | D75 | D66 | D76 | D77 |
| | G/G | G/G | G/G | G/G | G/G | G/G | G/G | G/G | G/G |
| b-11 | D78 | D78 | D77 | D67 | D76 | D74 | D64 | D77 | D78 |
| | G/G | G/G | G/G | G/G | G/G | G/G | G/G | G/G | G/G |
| b-12 | D77 | D77 | D74 | D66 | D77 | D77 | D64 | D76 | d78 |
| | G/G | G/G | G/G | G/G | G/G | G/G | G/G | G/G | G/G |
| b-13 | D78 | D79 | D76 | D67 | D75 | D73 | D65 | D78 | D77 |
| | G/G | G/G | G/G | G/G | G/G | G/G | G/G | G/G | G/G |

TABLE 2-continued

| Fluorinated (Meth)-acrylate (B) | Fluorinated (Meth)acrylate (A) | | | | | | | | |
|---|---|---|---|---|---|---|---|---|---|
| | a-1 | a-2 | a-5 | a-6 | a-7 | a-8 | a-9 | a-12 | a-13 |
| b-14 | D78 G/G | D64 G/G | D77 G/G | D65 G/G | D74 G/G | D75 G/G | D65 G/G | D77 G/G | D76 G/G |

When the whole or half of c-15(A) was replaced with c-9(A), each of the compositions had satisfactory transparency both before and after curing.

EXAMPLE 12

Curing compositions (5 x 5 x 5 mm) having the following formulation were prepared using each of the fluorinated (meth)acrylates (A) and fluorinated (meth)acrylates (B) shown in Tables 3 and 4.

| Formulation | |
|---|---|
| Fluorinated (meth)acrylate (A) | 63.6% |
| Fluorinated (meth)acrylate (B) | 15.9% |
| c-15 (A) | 20.0% |
| d-9 | 0.5% |
| γ-Mercaptopropyltrimethoxysilane | 1.2% |

For an immersion test, these curing compositions were immersed in acetone or ethyl acetate at 23° C., and then the weight change (wt %) after immersion for 48 hours (i.e., swelling degree) was measured. The results obtained are shown in Tables 3 and 4.

TABLE 3

| Immersion in Acetone | | |
|---|---|---|
| Fluorinated (Meth)acrylate (B) | Fluorinated (Meth)acrylate (A) | |
| | a-1 | a-7 |
| b-8 | +1.3 | +1.9 |
| b-9 | +1.2 | +1.7 |
| b-10 | +1.5 | +1.9 |
| b-11 | +4.7 | +5.3 |
| b-12 | +4.5 | +5.2 |

TABLE 4

| Immersion in Ethyl Acetate | | |
|---|---|---|
| Fluorinated (Meth)acrylate (B) | Fluorinated (Meth)acrylate (A) | |
| | a-1 | a-7 |
| b-8 | +3.7 | +4.6 |
| b-9 | +3.5 | +4.4 |
| b-10 | +3.9 | +4.7 |
| b-11 | +6.4 | +7.8 |
| b-12 | +6.4 | +7.6 |

As is clear from Tables 3 and 4, the cured resin of the composition using a combination of a-1 and b-8, a combination of a-1 and b-9, or a combination of a-1 and b-10 exhibited far more excellent solvent resistance than that of the composition using a combination of a-1 and b-11 or a combination of a-1 and b-12. Further, the cured resin of the composition using a combination of a-7 and b-8, a combination of a-7 and b-9, or a combination of a-7 and b-10 exhibited far more excellent solvent resistance than that of the composition using a combination of a-7 and b-11 or a combination of a-7 and b-12.

As described and demonstrated above, the curing resin composition according to the present invention is excellent in transparency and homogeneity at room temperature and is also excellent in transparency and dynamic strength after curing. Thus, when it is used as a cladding material or a coating material of optical fibers, excellent workability is obtained because of no need to heat as has been usual with the conventional cladding materials, whereby the problem of eccentricity frequently accompanying heating can be minimized while providing optical fibers excellent in mechanical strength, optical characteristics, and environmental resistance such as heat resistance and moisture resistance.

While the invention has been described in detail and with reference to specific examples thereof, it will be apparent to one skilled in the art that various changes and modifications can be made therein without departing from the spirit and scope thereof.

What is claimed is:

1. A curable coating composition comprising
   1) a first monomer represented by formula (A)

$$RfOCOC(R)=CH_2 \qquad (A)$$

wherein Rf represents linear or branched fluorinated alkyl group having not less that 6 carbon atoms, a hydroxyl substituted fluorinated alkyl having not less that 6 carbon atoms, a fluorinated sulfonamide having not less that 6 carbon atoms, or a fluorinated amide having not less that 6 carbon atoms, and R represents H. F, or $C_{1-10}$ fluorinated alkyl;
   2) a second monomer represented by formula (B) wherein Rf' represents a linear or branched $C_{1-5}$ fluorinated alkyl and R' represents —H, —F, or —CH$_3$; and
   3) at least one polyfunctional methacrylic curable monomer, wherein the weight ratio of the first monomer to the second monomer from 75:25 to 99:1.

2. A curable coating composition as defined in claim 1, wherein the first monomer is a member of the group consisting of $C_8F_{17}CH_2CH_2OCOC(R)=CH_2$ and $C_6F_{13}CH_2CH_2OCOC(R)=CH_2$ and R represents H, F, or $C_{1-10}$ fluorinated alkyl.

3. A curable coating composition as defined in claim 1, wherein Rf' is at least one of a branched $C_{1-5}$ fluorinated alkyl or a linear $C_{1-5}$ fluorinated alkyl, each having a fluorohydrocarbon end group.

4. A curable coating composition as defined in claim 1, wherein the second monomer is a member of the group consisting of $H(CF_2CF_2)_2CH_2OCOC(R')=CH_2$ and $(CF_3)_2CHOCOC(R')=CH_2$.

5. A curable coating composition as defined in claim 1, wherein the polyfunctional curable monomer is present in an amount of 1 to 50% by weight compared to the total weight of the curable composition.

6. A curable composition as claimed in claim 1, wherein said polyfunctional curing monomer (3) is $(CH_2=C(R)COOCH_2)_3CC_2H_5$, wherein R represents a hydrogen atom, a methyl group, or a fluorine atom.

7. A curable composition as claimed in claim 1, wherein said polyfunctional curing monomer (3) is trimethylolpropane triacrylate.

8. A curable composition as claimed in claim 1, wherein said composition contains a thiol-containing compound.

9. A curable composition as claimed in claim 8, wherein said thiol-containing compound is γ-mercaptopropyltrimethoxysilane.

* * * * *